Sept. 23, 1947.  J. W. WEST  2,427,756
METHOD OF PRODUCING SERRATED SLEEVES
Filed Oct. 27, 1945  3 Sheets-Sheet 1

INVENTOR
John W. West
BY James C. Ledbetter
ATTORNEY

Sept. 23, 1947.  J. W. WEST  2,427,756
METHOD OF PRODUCING SERRATED SLEEVES
Filed Oct. 27, 1945  3 Sheets—Sheet 2
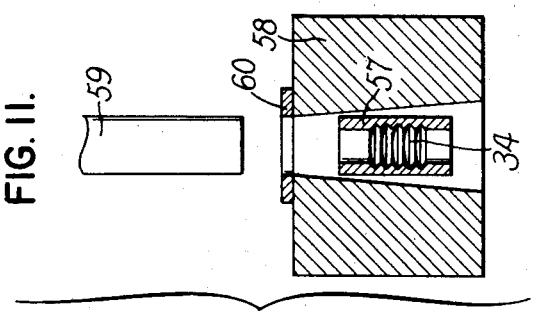
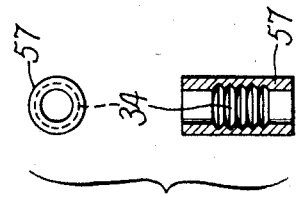
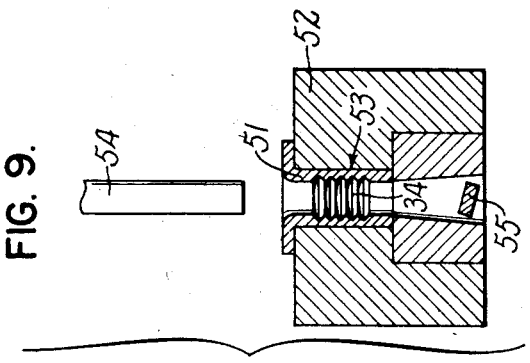
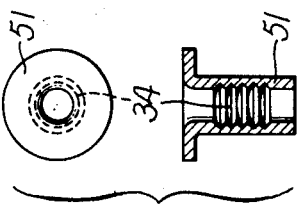
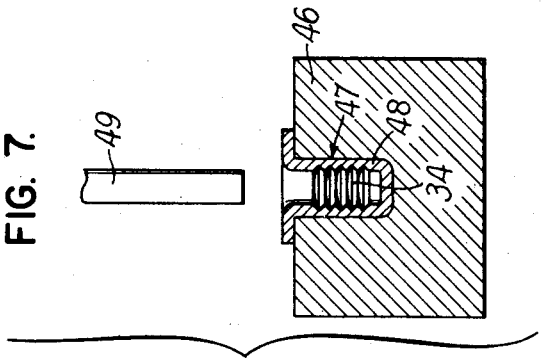
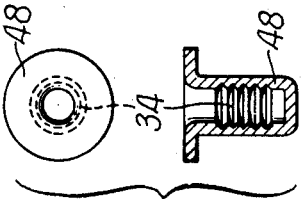
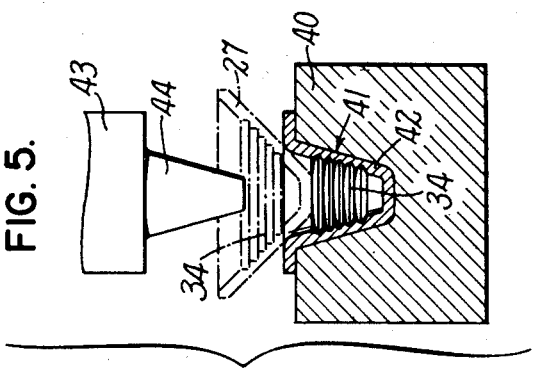
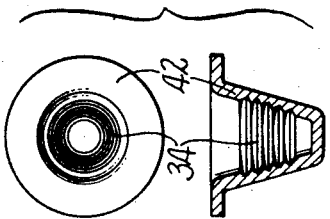
INVENTOR
*John W. West*
BY
*James C. Ledbetter*
ATTORNEY Sept. 23, 1947.  J. W. WEST  2,427,756
METHOD OF PRODUCING SERRATED SLEEVES
Filed Oct. 27, 1945  3 Sheets-Sheet 3

INVENTOR
John W. West
BY James C. Ledbetter
ATTORNEY

Patented Sept. 23, 1947

2,427,756

UNITED STATES PATENT OFFICE 2,427,756

METHOD OF PRODUCING SERRATED SLEEVES

John W. West, Maplewood, N. J., assignor to The Thomas & Betts Co., Elizabeth, N. J., a corporation of New Jersey Application October 27, 1945, Serial No. 625,074

2 Claims. (Cl. 29—155.55)

1

This invention relates to sleeves or tubular members formed with internally serrated, grooved, or roughened surfaces, such as inside thread-like formations. Examples of such sleeves are found in electrical connectors, such as wire terminals, splicers, electrical tap connectors and the like. And the invention may be referred to as a method of producing serrated sleeves.

In a variety of electrical wire connectors of the solderless types, which are swaged, crimped or compressed in a conventional manner, to bond them onto a conductor wire by a cold-flow weld, it is an advantage to provide serrations, ridges, or thread-like grooving (as is known in the art) on the inside surface of the wire receiving sleeve or tubular body of the electrical connector in order to attain a maximum grip by biting into the wire. The serrations or surface ridges not only serve to make a permanently strong mechanical joint, but more particularly produce an effective electrical connection by squeezing or biting through oxide film and other foreign matter on the wire surfaces, thus reducing the electrical resistance at the bonded joint between the connector and the wire conductor.

Accordingly, this invention provides a connector sleeve or conductor-receiving receptacle having a series of internally formed annular grooving, thread-like formations, or serrations made therein transversely of the axis of the sleeve and of the wire to be secured in said sleeve by the use of a well known swaging or crimping tool which reduces by pressure the wire and serrated sleeve into a unitary joint of homogeneous form.

A purpose of the invention is to simplify the production of electrical connector sleeves and like parts having annular serrations in the form of grooving, or a thread-like formation, pressed into the inside cylindrical surface of such parts.

A further purpose is to provide complete circular (annular) serrations within the sleeves, as distinguished from incomplete or half-circular (segmental) serrations so frequently used in electrical connectors of known types. The complete annular serrations as herein shown have the advantage of establishing a maximum mechanical grip and low resistance electrical connection with a wire as known in the art, but problems of manufacture exist which this invention seeks to solve.

It is a further purpose to provide an improved method of manufacturing these tubular parts from copper or other sheet metal, by fashioning a flat metal blank into cylindrical shape and simultaneously forming the serrations or grooving therein for use in connection with the manufacture of electrical connectors.

This description and the accompanying drawings explain the invention and indicate further purposes thereof, present it in a manner preferred at this time, demonstrate the features

2 thereof in order to disclose the scope and principle of the invention, thus suggesting further examples of construction which may develop out of the teachings herein or which may occur to others who wish to avail themselves of the benefits of the invention, and also aid in understanding the problems sought to be solved.

The drawings demonstrate a progressive-die operation, as in the use of a single automatic machine tool, for drawing, forming, and punching a flat metallic piece or blank into tubular form with internal annular serrations. However, the views are preferably separated one from another for the purpose of clarity, as in the use of an individual machine forming tool for each stage or station in the progressive-die operation. But the principle is the same in any event, so that the particular machine tool set-up for producing the serrated connector sleeves is a matter of choice.

Fig. 5 shows a smooth cone reducing and elongating punch and its cooperating die for elongating and decreasing the diameter of the Fig. 4 blank of the previous operation; and Fig. 6 shows a plan and a sectional view of the blank removed from the machine of Fig. 5.

Fig. 7 shows a smooth cylindrical elongating punch and die for further increasing the length and decreasing the diameter of the Fig. 6 conical blank and for converting it to sleeve or tubular form; and Fig. 8 shows a plan and sectional view of this sleeve blank with its internal serrations first imprinted therein at Fig. 3.

Fig. 9 shows a cooperating end-punch and cut-out die of cylindrical formation for punching out the end of the previously formed sleeve shown at Figs. 7 and 8; while Fig. 10 shows a plan and sectional view of this sleeve now of tubular form and open at both ends.

Fig. 11 demonstrates what may be the final machine operation, where a cylindrical knock-out punch cuts and ejects the finished sleeve from a die, in order to make the completed part shown in Fig. 12 which has internal serrations or grooving of completely circular, that is, annular form.

Figure 3:
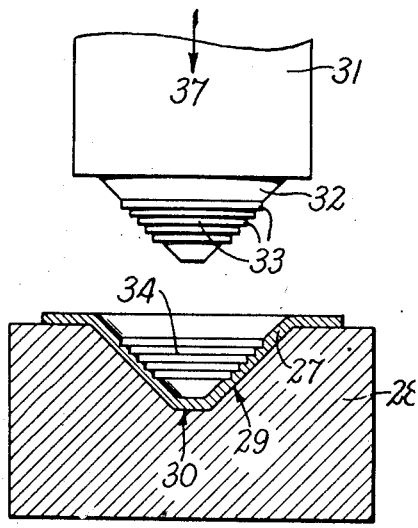
Fig. 3 shows an example of what may be the next step in the method, the smooth conical or cupped blank of Fig. 2 being next worked by a conically shaped ridged or serrating punch, which presses the blank into a smooth surface conical female die, to advance the blank to the form and shape shown in Fig. 4, thus initially forming a terrace of serrations or grooving in the work piece.
Figure 13:
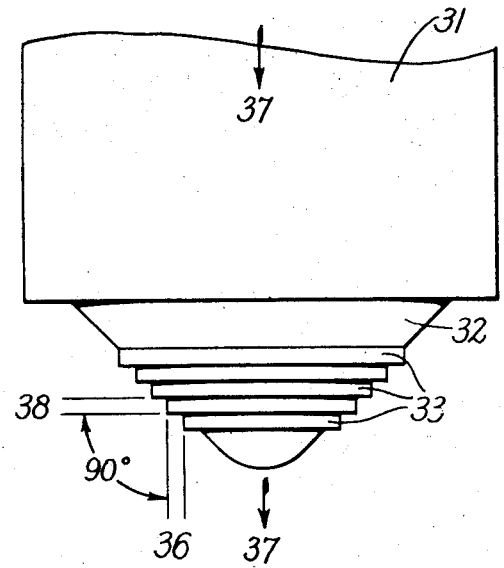

Fig. 13 is a diagrammatic enlarged view of the serrating punch shown in Fig. 3 for the purpose of more clearly explaining the inverted terraced or stepped ridged punch, that is, the results thereof in the stages of operation from Fig. 1 through Fig. 12.

Figure 14:
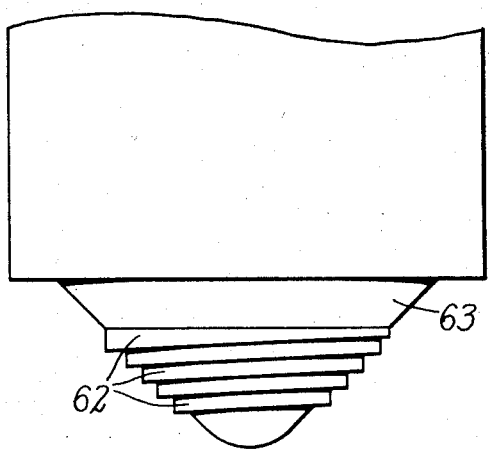

Fig. 14 is also an enlarged diagrammatic view showing a form of punch having spiralled stepped ridges or inverted terracing for producing thread-like formed grooving in the work piece to provide helical serrations, as distinguished from the parallel serrations first formed at the Fig. 3 station.

Figure 15:
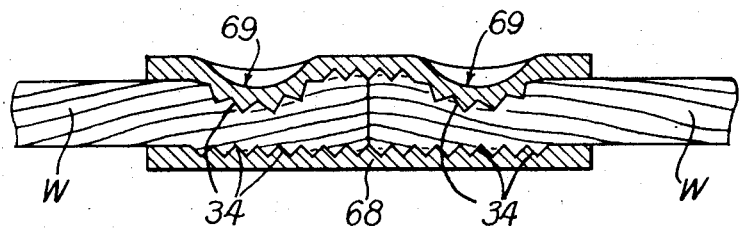

Fig. 15 shows a wire splicing connector in longitudinal section and crimped onto a conductor wire to illustrate the advantages of providing annular or complete circular serrations in a solderless wire connector.

Figure 16:
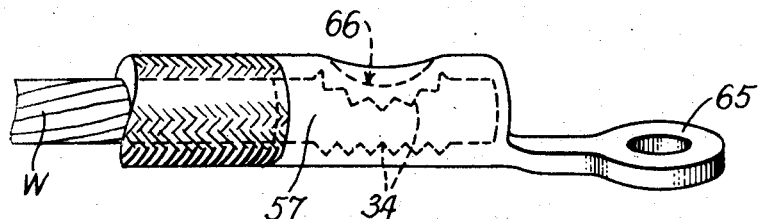

Fig. 16 shows a terminal in side elevation and also crimped onto an electrical conductor.

Figure 1:
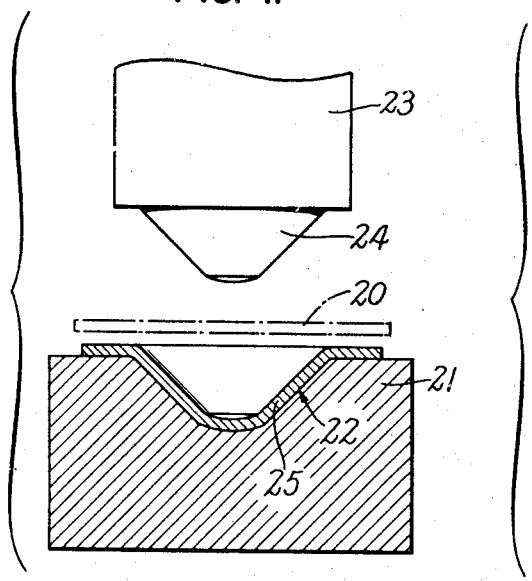
Fig. 1 shows a flat sheet metal blank (in dotted lines) before being deformed or cupped into cone shape by a first operation employing the illustrated smooth surface conical female die and a smooth surface male punch constituting a machine forming tool.
Figure 2:
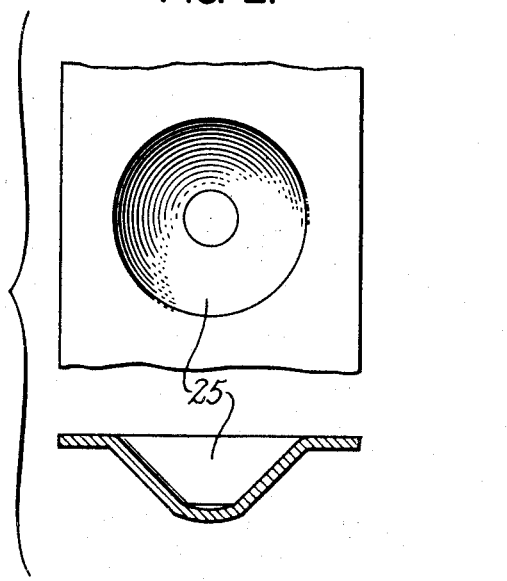
Fig. 2 shows a plan as well as sectional view of the deformed blank removed from the machine forming tool of Fig. 1.

Referring further to the drawings for a more detailed description of the invention, there is first shown a flat metal blank 20 (in dotted lines Fig. 1) just before it is placed on a die 21 having an internal smooth conical cavity or cup-like depression 22. A cupping punch 23 has a smooth external conical end 24 conforming with the die depression or cup 22. The punch swages the metal blank 20 into the die 21, and thus initially produces a cup-shaped blank 25, as shown in Figs. 1 and 2.

Figure 4:
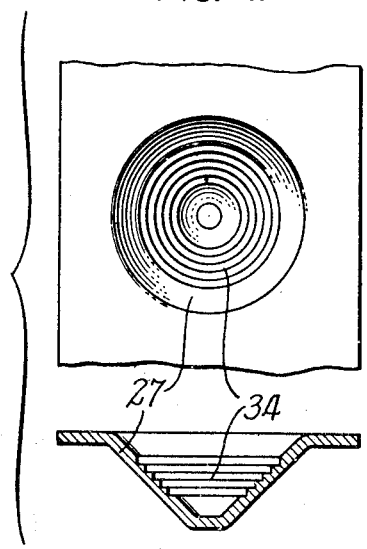

The blank 25 is next shown at 27 (Fig. 3) as having been fed to a die 28 having a conical cavity 29 with a bottom apex 30 which may be somewhat deeper and of smaller diameter than the bottom of the first die cavity 22. A grooving punch 31 (Figs. 3 and 13) is provided with a conical end 32 of the same form and dimensions as the die cavity 29 with which it coacts. However, this second punch 31 is provided with a series of circular or annular stepped ridges 33 of inverted terraced form disposed in mid-position of its conical end 32. The downward stroke of the punch 31 imprints a like series of circular or annular stepped grooves 34 terraced upright into the cupped blank or work piece 27, as shown in Figs. 3 and 4.

The side surfaces 36 (indicator lines in Fig. 13) of the stepped ridges terraced at 33 are formed concentrically with and parallel to the axis (indicated by arrows 37 in Figs. 3 and 13) of the grooving or serrating punch 31. The bottom surfaces 38 (also see indicator lines in Fig. 13) are defined by a plane at right angles to the axis 37 of the grooving punch 31. Hence the included angle is 90° as marked on Fig. 13. Since the side surfaces 36 of the grooving or serrating punch 31 is parallel to the axis 37 of said punch, it follows that the punch readily withdraws from the cupped blank 27, and leaves therein the upright terraced series of stepped grooves 34 as the counterpart of the inverted stepped ridges 33 carried by the punch.

The cupped and initially grooved blank 27 is next shown progressively placed (in dotted lines, Fig. 5) on a die 40 having a smooth cone diameter reducing and axial elongating cavity 41 in which the work piece 42 (previously 27) is further reduced. A punch 43 has a smooth reducing and elongating conical end 44, which is the counterpart of the die cavity 41, and this punch acts to press and draw the blank 27 into the form now shown at 42. Thus the upper base of the conical blank 27, that is, its largest end is reduced by pressing it into the cavity 41. And this operation elongates the axis of the blank from 27 to 42, since the die cavity 41 is progressively deeper than the previous die cavity 29 in Fig. 3.

The operation by the punch end 44 and die 40 deforms the grooving or serrations 34 in the blank or work piece 27 by more nearly directing or pointing them toward the axis of the reformed sleeve blank 42. Thus the original set or position of the square-shoulder grooves 34 is changed or advanced in the die 40 to produce sharp edge ring grooves or serrations 34 more nearly disposed in final relation to the axis of the blank 42 to ultimately have good biting characteristics for bonding onto an electrical conductor, as will be noted in Figs. 15 and 16.

The sleeve blank 42 internally serrated at 34 is next transferred to a die 46 (Fig. 7) having a smooth cylindrical elongating cavity 47. At this stage of the forming operation, the work-piece (formerly indicated at 42) is now marked 48. A cylindrical elongating punch 49 coacts with the die cavity 47 to reduce the former blank 42 to its true cylindrical form 48. The length of the sleeve blank 48 may remain about the same as that of the previous stage at 42. And now the sharp edges of the serrations 34 are finally and completely directed toward the axis of the sleeve 48 in final symmetrical relation thereto. Thus the surfaces 36 and 38 (Fig. 13) of the serrations 34 are disposed at an angle to the axis 37 of the sleeve blank 42 which has attained its final cylindrical form of ultimate inside diameter and length.

The former cylindrical blank 48 is next operated upon in Fig. 9 where it is indicated at 51. The former blank 48 is placed in an end punch-out die 52 having a receiving cavity 53. An end cut-out punch 54 drives downwardly through the sleeve blank 51 and punches out its end, as demonstrated in Fig. 9, where an end portion 55 of the serrated sleeve 51 is noted as falling downwardly through the passage of the punch-out die 52. At this stage, the internally serrated sleeve 51 now is open at both ends and remains to be trimmed at its upper end, its serrations 34 having attained finished form at Fig. 7 station.

The serrated sleeve (formerly 51) is next designated and finished at 57 (in Fig. 11) where it is falling from a finishing die 58, having been ejected therefrom by a sleeve finishing knock-out punch 59. A ring of waste trimming material from the finished sleeve 57 may be noted at 60. And the serrations are seen at 34.

In Fig. 14, it will be noted that stepped or inverted terrace ridges 62 are annularly and spirally formed on a conical punch end 63. This spiralled terrace arrangement has side or cylindrical surfaces, as well as bottom surfaces, of the same right angular form as indicated at 90° in Fig. 13 and by the indicator lines 36 and 38 therein. Thus it will be observed that this modified form of punch 62, 63 can be used at the Fig. 3 station in the same fashion and withdraws from the work in the same manner as heretofore explained in connection with the punch 31, with the result that the grooving at 34 in the cupped blank 27 would have a thread-like form to produce a continuous helical serration.

The sleeve 57 (Figs. 11 and 12) is now in final form and may be used in the manufacture of various types of conventional electrical connectors, as suggested in the last two views of the drawings showing two types thereof, wherein the serrations 34 are greatly enlarged for clarity.

Fig. 16 shows the sleeve 57 adapted as an electrical conductor end terminal. A terminal of this type has a connecting tongue 65 at one end either made separately and secured thereto or made integral therewith. The form, shape and size of the tongue or eye 65 are not treated herein because not directly related to the method of simultaneously serrating and drawing a connector sleeve, but such tongue as shown, or of any other form required by the trade, may be produced on the dies heretofore discussed by shaping the dies to produce the tongue during the die-forming process.

The serrations 34 (Figs. 15 and 16) are the result of employing one or the other grooving punch 32, 33 or 62, 63 (Figs. 13 and 14). The serrated sleeve 57 is anchored on a de-insulated end of a wire W by applying a side crimp 66, or other known form of swaging, in the sleeve with a tool of conventional form. The compression and reduction at the crimp 66 forces the serrations 34 into the wire W and compresses the sleeve 57 thereon, thus providing a good mechanical and low-resistance solderless electrical connection.

In Fig. 15, there is shown an electrical splice connector for joining two conductor wires W. The splice comprises a sleeve 68 which may also be produced in accordance with the principles of this invention and provided with internal serrations 34. The two wires W are placed into the opposite ends of the sleeve 68, and one or more crimps 69 are applied the same as heretofore explained at 66 in the terminal shown in Fig. 16. In other words, the splice sleeve connector 68 may contain a longer series of serrations 34 than are shown in connection with the terminal connector 57.

The full or completely circular (annular) serrations 34 are thus readily formed in tubular parts and fittings, especially in electrical connectors of the sleeve or tubular body type. Such annular serrations provide a larger area of biting and holding engagement with conductor wires than is possible to attain where only a side or a segmental portion of an electrical receptacle sleeve is serrated.

The disclosure herein explains the principle of the invention and presents the best mode contemplated in applying such principle, so as to distinguish the invention from others; and there is particularly pointed out and claimed, the part, improvement or combination, which constitutes the invention or discovery, as understood by a comparison thereof with the prior art.

This invention is presented to fill the need for a useful method of producing serrated sleeves. Various modifications in construction, mode of operation, use and method, may and often do occur to others skilled in the art, especially so after acquaintance with an invention. Accordingly, this disclosure is exemplary of the principles and equivalents without being limited to the present showing of the invention.

What is claimed is:
1. A method of producing sleeves and tubular body parts from which to make electrical connectors having internal serrations by die-forming operations, which comprises initially cupping a flat metal blank to conically shape it, imprinting internal stepped ridges into the conically shaped blank with the sides of said ridges in parallel relation to the axis of the conically shaped blank, progressively die-reducing the conically shaped blank to eventual cylindrical form during which the sides of the ridges are deformed progressively inwardly at an angle to the axis of the blank and hence out of the parallel relation aforesaid, and elongating the blank during the die-reducing operation until it is shaped progressively into a sleeve of final length and cylindrical form containing the grooving in the form of serrations the edges of which are disposed symmetrically toward the axis of the finished sleeve and the sides at an angle thereto as aforesaid.

2. A method of producing sleeves and tubular body parts from which to make electrical connectors having internal serrations of full-circular or annular form by die-drawing operations, which comprises initially cupping a flat metal blank to conically shape it, imprinting internal full-circular or annular stepped ridges with the sides of said annular ridges in parallel relation to the axis of the conically shaped blank, progressively die-reducing the conically shaped blank to eventual cylindrical form during which the sides of the annular ridges are deformed progressively inwardly at an angle to the axis of the blank and hence out of the parallel relation aforesaid, and elongating the blank during the die-reducing operation until it is shaped progressively into a sleeve of final length and cylindrical form containing the annular grooving in the form of full-circular serrations the edges of which are disposed symmetrically toward the axis of the finished sleeve and the sides at an angle thereto as aforesaid.

JOHN W. WEST.

REFERENCES CITED

The following references are of record in the file of this patent:

UNITED STATES PATENTS

| Number | Name | Date |
| --- | --- | --- |
| 2,026,859 | Baynes | Jan. 7, 1936 |
| 1,040,567 | Newell | Oct. 8, 1912 |
| 1,990,718 | Swanstrom | Feb. 12, 1935 |
| 2,071,340 | Hothersall | Feb. 23, 1937 |
| 2,225,710 | Norris | Dec. 24, 1940 |
| 556,649 | Smith | Mar. 17, 1896 |
| 2,375,741 | Dibner | May 8, 1945 |
| 2,295,899 | Hoppenstand | Sept. 15, 1942 |